US012126615B2

(12) United States Patent
Williams et al.

(10) Patent No.: US 12,126,615 B2
(45) Date of Patent: Oct. 22, 2024

(54) SYSTEMS AND METHODS FOR PASSIVE MULTI-FACTOR AUTHENTICATION OF DEVICE USERS

(71) Applicant: Mastercard Technologies Canada ULC, Vancouver (CA)

(72) Inventors: Kyle Williams, Wentzville, MO (US); David J. Senci, Troy, IL (US); Paige Fogarty, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 503 days.

(21) Appl. No.: 17/138,599

(22) Filed: Dec. 30, 2020

(65) Prior Publication Data

US 2022/0210151 A1   Jun. 30, 2022

(51) Int. Cl.
*H04L 29/06* (2006.01)
*G06F 18/214* (2023.01)
*H04L 9/40* (2022.01)

(52) U.S. Cl.
CPC ........ *H04L 63/0861* (2013.01); *G06F 18/214* (2023.01); *H04L 63/0876* (2013.01); *H04L 63/101* (2013.01); *H04L 2463/082* (2013.01)

(58) Field of Classification Search
None
See application file for complete search history.

(56) References Cited

U.S. PATENT DOCUMENTS 9,251,327 B2 *   2/2016   Donfried ............... G06F 21/316
9,355,231 B2     5/2016   Disraeli
(Continued)

FOREIGN PATENT DOCUMENTS

CN   107077547 B   8/2019
CN   209659342 U   11/2019
(Continued)

OTHER PUBLICATIONS

Chauhan (Chauhan et al., "ContAuth: Continual Learning Framework for Behavioral-based User Authentication", Proceedings of the ACM on Interactive, Mobile, Wearable and Ubiquitous Technologies vol. 4Issue 4, Article No. 122pp. 1-23, https://doi.org/10.1145/3432203) (Year: 2020).*

(Continued)

*Primary Examiner* — Piotr Poltorak
(74) *Attorney, Agent, or Firm* — Armstrong Teasdale LLP

(57) ABSTRACT

A passive Multi-Factor Authentication (MFA) system includes a passive MFA server that receives, from a user computing device, passive biometrics data and device data collected during a current session on a remote site; submits the passive biometrics data to a user profile model, and in response receives a user authentication confidence score; and submits the device data to a device profile model, and in response receives a device authentication confidence score. The passive MFA server is also configured to receive a user authentication request for a current payment transaction associated with the current session on the remote site, and transmit the user authentication confidence score and the device authentication confidence score to an Access Control Server (ACS) configured to determine that the scores satisfy a predefined threshold for passively authenticating a user of the user computing device during the current session, without conducting an active authentication process with the user.

21 Claims, 6 Drawing Sheets

(56) References Cited

U.S. PATENT DOCUMENTS

| | | | |
|---|---|---|---|
| 9,396,319 B2 | 7/2016 | Shuart et al. | |
| 10,015,171 B1* | 7/2018 | Vardy | H04L 63/102 |
| 10,027,662 B1* | 7/2018 | Mutagi | H04L 63/0861 |
| 10,057,227 B1 | 8/2018 | Hess et al. | |
| 10,129,247 B2 | 11/2018 | Stubblefield | |
| 10,305,895 B2 | 5/2019 | Barry et al. | |
| 10,326,775 B2 | 6/2019 | Ford et al. | |
| 10,432,605 B1* | 10/2019 | Lester | G06F 21/552 |
| 10,594,677 B2 | 3/2020 | Oberheide et al. | |
| 10,824,702 B1 | 11/2020 | Shahidzadeh et al. | |
| 10,834,084 B2 | 11/2020 | Ouellette et al. | |
| 11,310,228 B1* | 4/2022 | Rao | G06V 40/172 |
| 2003/0208684 A1* | 11/2003 | Camacho | G06Q 20/401 |
| | | | 713/185 |
| 2007/0136573 A1 | 6/2007 | Steinberg | |
| 2012/0233665 A1* | 9/2012 | Ranganathan | G06Q 20/4016 |
| | | | 726/4 |
| 2014/0143149 A1* | 5/2014 | Aissi | H04W 12/30 |
| | | | 455/411 |
| 2014/0316984 A1* | 10/2014 | Schwartz | G06Q 20/322 |
| | | | 705/44 |
| 2015/0059003 A1* | 2/2015 | Bouse | G06F 21/31 |
| | | | 726/28 |
| 2015/0089568 A1* | 3/2015 | Sprague | H04L 63/0853 |
| | | | 726/1 |
| 2016/0110528 A1* | 4/2016 | Gupta | G06F 21/577 |
| | | | 726/19 |
| 2016/0182503 A1* | 6/2016 | Cheng | H04W 12/082 |
| | | | 726/7 |
| 2016/0232480 A1* | 8/2016 | Erez | G06Q 20/12 |
| 2017/0230417 A1* | 8/2017 | Amar | H04L 63/08 |
| 2018/0293367 A1 | 10/2018 | Urman | |
| 2019/0149540 A1* | 5/2019 | Shimazu | H04W 12/06 |
| | | | 726/4 |
| 2019/0188368 A1 | 6/2019 | Hastings | |
| 2019/0188720 A1* | 6/2019 | Williams | G06Q 20/4016 |
| 2020/0004939 A1* | 1/2020 | Streit | H04L 63/102 |
| 2020/0042723 A1 | 2/2020 | Krishnamoorthy et al. | |
| 2020/0169566 A1 | 5/2020 | Wolf et al. | |
| 2020/0412703 A1* | 12/2020 | Kohli | G06F 21/6245 |
| 2021/0160687 A1* | 5/2021 | Ross | G06N 3/08 |

FOREIGN PATENT DOCUMENTS

| | | | |
|---|---|---|---|
| EP | 3229163 B1 | | 11/2019 |
| JP | 2009175984 | * | 8/2009 |
| JP | 2009175984 A | | 8/2009 |
| JP | 2017201466 A | | 11/2017 |
| WO | 2017191719 A1 | | 11/2017 |
| WO | 2019028089 A1 | | 2/2019 |
| WO | 2019029818 A1 | | 2/2019 |
| WO | 2019152592 A1 | | 8/2019 |
| WO | 2020178206 A1 | | 9/2020 |
| WO | 2020178208 A1 | | 9/2020 |
| WO | 2020178209 A1 | | 9/2020 |
| WO | 2020178210 A1 | | 9/2020 |
| WO | 2020178211 A1 | | 9/2020 |

OTHER PUBLICATIONS

3Dsecure.2.com, "3DSecure2", author unknown, found at https://3dsecure2.com/frictionless-flow/; Apr. 2018 (Year: 2018).*

"Multi-factor authentication", Wikipedia webpage, Jan. 17, 2020, Wikipedia, 10 pages, retrieved on Jan. 17, 2020, URL:https://en.wikipedia.org/wiki/Multi-factor_authentication.

"EMV® 3-D Secure SDK—Device Information v2.0.0," Jan. 2017, 39 pages.

"EMV® 3-D Secure SDK—Device Information Data Version 1.4," Oct. 2019, 42 pages.

"EMV® 3-D Secure SDK Specification v2.2.0," Dec. 2018, 130 pages.

"EMV® 3-D Secure Protocol and Core Functions Specification v2.2.0," Dec. 2018, 286 pages.

"EMV® 3-D Secure SDK Specification v2.1.0," Oct. 2017, 138 pages.

"EMV® 3-D Secure Protocol and Core Functions Specification v2.0.0," Oct. 2016, 227 pages.

"EMV® 3-D Secure Protocol and Core Functions Specification v2.1.0," Oct. 2017, 255 pages.

"Visa Secure—User Interface Guide for 3-D Secure 1.0.2 v1.0," 23 pages.

"3-D Secure", Wikipedia webpage, Wikipedia, 9 pages, retrieved on Jan. 17, 2020, URL: https://en.wikipedia.org/wiki/3-D_Secure.

"Merchant plug-in", Wikipedia webpage, Wikipedia, 1 page, retrieved on Jan. 17, 2020, URL: https://en.wikipedia.org/wiki/Merchant_plug-in.

"3D Secure Flow", Wikipedia PNG, Wikipedia, 3 pages, retrieved on Jan. 17, 2020, URL: https://en.wikipedia.org/wiki/File:3D_Secure_Flow.png.

"Verified by Visa Acquirer and Merchant Implementation Guide U.S. Region," May 2011, 106 pages.

"Library > 3-D Secure 1.0," Webpage, 1 page, retrieved on Jan. 17, 2020, URL: https://technologypartner.visa.com/Library/3DSecure.aspx.

PCT International Search Report and Written Opinion, Application No. PCT/US2021/060934, dated Mar. 15, 2022, 12 pages.

* cited by examiner

SYSTEMS AND METHODS FOR PASSIVE MULTI-FACTOR AUTHENTICATION OF DEVICE USERS

BACKGROUND

The field of the disclosure relates generally to authenticating the identity of an on-line user, and more particularly, to systems and methods for authenticating users online, e.g., in mobile applications, by using passive multi-factor authentication.

Parties who are active online often are required to authenticate their identity in order to achieve an objective. For example, parties involved in web-based or mobile application-based payment transactions, such as cardholders, merchants, payment processors, issuer banks, and acquirer banks, have a shared interest in enhancing the security of the transactions by verifying that the on-line customer is in fact an authorized user of the payment account presented for payment. Moreover, certain jurisdictions have codified requirements for on-line user authentication. For example, the European Banking Authority has introduced legislation known as PSD2 which requires that online payment transactions have "strong customer authentication" by verifying that the on-line customer satisfies at least two of three factors: (i) knowledge (something only the authentic payment account holder knows), (ii) possession (something only the authentic payment account holder possesses) and (iii) inherence (something only the authentic payment account holder is, e.g., a unique biometric identifier).

At least some known systems meet these requirements by demanding one or more active authentication steps from the on-line user, e.g., by requiring the on-line user to answer a step-up challenge question directed to something only the authentic payment account holder knows, by sending a one-time passcode to a previously verified device of the authentic payment account holder to serve as something only the authentic payment account holder possesses, and/or by requiring the on-line user to submit a fingerprint or iris scan to match against the unique biometric identifier of the authentic payment account holder. However, these active steps introduce friction into the on-line user's pursuit of the objective, in the form of irritating delays or even inability to complete the requested transaction, e.g., if the on-line customer is not currently near the device registered to receive the one-time passcode or has forgotten a previously submitted answer to a challenge question. Merchants, who fear loss of transaction revenue caused by such friction, may decide not to adopt, or to circumvent, such enhanced security protocols. Accordingly, there is a need for a multi-factor authentication system that reduces or eliminates such friction.

BRIEF DESCRIPTION OF THE DISCLOSURE

In one aspect, a passive Multi-Factor Authentication (MFA) system including an Access Control Server (ACS) and a passive MFA server is provided. The passive MFA server includes at least one first processor in communication with a memory device and a communications interface. The ACS includes at least one second processor in communication with a memory device. The passive MFA server receives, via the communications interface from a user computing device, passive biometrics data and device data collected during a current session of the user computing device on a remote site; submits the passive biometrics data to a user profile model, and in response receives a user authentication confidence score; and submits the device data to a device profile model, and in response receives a device authentication confidence score. The passive MFA is also configured to receive, via the communications interface, a user authentication request for a current payment transaction associated with the current interactive session on the remote site; and transmit, via the communication interface, the user authentication confidence score and the device authentication confidence score to the ACS. The ACS is configured to determine that the user authentication confidence score and the device authentication confidence score satisfy a predefined threshold for passively authenticating a user of the user computing device during the current session; and transmit, to the remote site in response to the determination and without conducting an active authentication process with the user, an indication that the user is authenticated for the current payment transaction.

In another aspect, a computer-implemented method for Multi-Factor Authentication (MFA) is also provided. The method is implemented using an Access Control Server (ACS) and a passive MFA server. The passive MFA server includes at least one first processor in communication with a memory device and a communications interface. The ACS includes at least one second processor in communication with a memory device. The method includes receiving by the passive MFA server, via the communications interface from a user computing device, passive biometrics data and device data collected during a current session of the user computing device on a remote site; submitting, by the passive MFA server, the passive biometrics data to a user profile model, and in response receiving a user authentication confidence score; and submitting, by the passive MFA server, the device data to a device profile model, and in response receiving a device authentication confidence score. The method further includes receiving by the passive MFA server, via the communications interface a user authentication request for a current payment transaction associated with the current interactive session on the remote site; transmitting by the passive MFA server, via the communication interface, the user authentication confidence score and the device authentication confidence score to the ACS; determining, by the ACS, that the user authentication confidence score and the device authentication confidence score satisfy a predefined threshold for passively authenticating a user of the user computing device during the current session; and transmitting, by the ACS, to the remote site in response to the determination and without conducting an active authentication process with the user, an indication that the user is authenticated for the current payment transaction.

In another aspect, at least one non-transitory computer readable medium that includes a first set of computer executable instructions and a second set of computer executable instructions for passive Multi-Factor Authentication (MFA) is provided. When executed by a passive MFA server including at least one first processor in communication with a communications interface, the first set of computer executable instructions cause the at least one first processor to receive, via the communications interface from a user computing device, passive biometrics data and device data collected during a current session of the user computing device on a remote site; submit the passive biometrics data to a user profile model, and in response receive a user authentication confidence score; and submit the device data to a device profile model, and in response receive a device authentication confidence score. The first set of computer executable instructions further cause the at least one first processor to receive, via the communications interface, a user authentication request for the current payment transaction associated with the current interactive session on the remote site; and transmit, via the communication interface, the user authentication confidence score and the device authentication confidence score to an Access Control Server (ACS) including at least one second processor. When executed by the ACS, the second set of computer executable instructions cause the at least one second processor to determine that the user authentication confidence score and the device authentication confidence score satisfy a predefined threshold for passively authenticating a user of the user computing device during the current session; and transmit, to the remote site in response to the determination and without conducting an active authentication process with the user, an indication that the user is authenticated for the current payment transaction.

DETAILED DESCRIPTION OF THE DISCLOSURE

Figure 1:
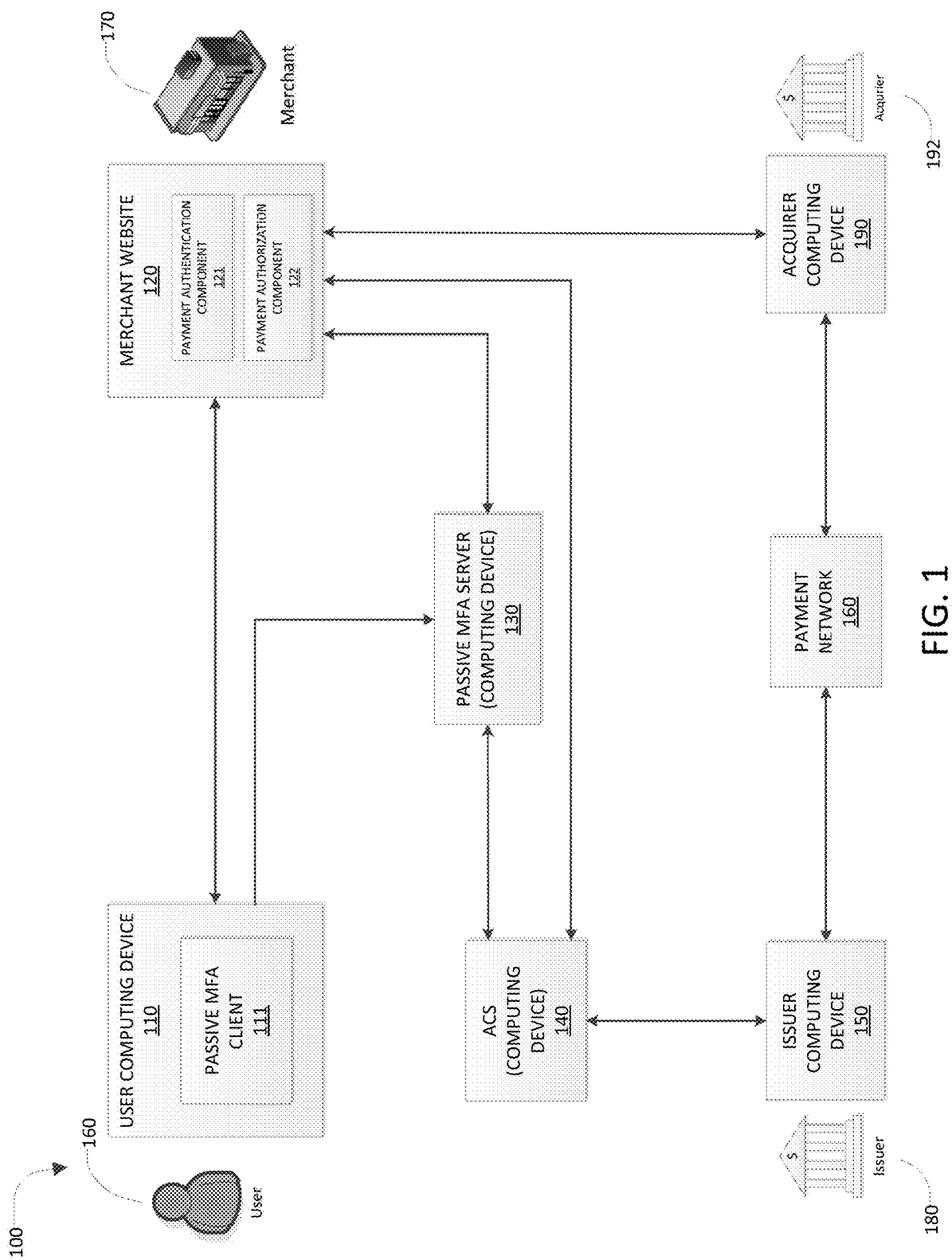
FIG. 1 is a schematic diagram illustrating an example embodiment of a system for authenticating payment transactions using passive Multi-Factor Authentication (MFA) including a passive MFA server and a passive MFA client.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

The systems and methods described in the present disclosure enable passive, multi-factor authentication (MFA) of online users. The term "passive" in this context means executing in the background and requiring no authentication-specific action or input from the online user, in other words, no additional action or input from the online user beyond the online user's routine activity (e.g., browsing the merchant's website, placing an item in an online shopping cart, completing a check-out on the site, etc.). In addition to reducing the friction of conventional authentication methods as discussed above, the authentication process described herein enables continuous learning of the online user's identifying characteristics and hence results in a more robust and streamlined authentication process. More specifically, because the predictive data models learn the online user's identifying characteristics from a rich training data set generated continuously from each mouse action or finger tap of the online user's online activity, the models are able to predict the legitimacy of the online user's identity with greater accuracy than conventional authentication systems. Furthermore, the predictive data models continuously improve their prediction accuracy by learning from new training data generated from each new online session and prediction results. Accordingly, rather than requiring the online user to take active authentication steps as a prerequisite for achieving an objective (e.g., presenting a payment account for an online purchase), the systems and methods described herein are enabled, with confidence, to rely on the predictive data models' prediction and authenticate the online user without requiring any active authentication steps (e.g., step-up challenge questions, iris scans, one-time passwords) from the online user.

The systems and methods in the present disclosure describe a passive MFA system including a passive MFA server configured to work in conjunction with a passive MFA client and an Access Control Server (ACS) to authenticate payment transactions initiated by the online user. More specifically, the passive MFA server first trains a user profile model and a device profile model using the online user's passive biometrics data and the device data of the online user's computing device, respectively, collected by a passive MFA client from the online user's online activity. After training is complete, the passive MFA server compares the online user's passive biometrics data and the device data of the online user's computing device during current online activity at a remote site, such as on a merchant site, receives a request for authentication of the online user in connection with a payment transaction associated with the user's current session, and then forwards to the ACS a user authentication confidence score and a device authentication confidence score after executing the trained user profile model and the trained device profile model against the behavioral and device data for the current online session. In response to the authentication confidence scores, the ACS then responds to the merchant site with an "authenticated" authentication response if the authentication confidence scores satisfy a predefined threshold for passively authenticating an online user. Alternatively, the ACS responds with a "not authenticated" authentication response if the authentication confidence scores fall below the predefined threshold for passively authenticating an online user. In some embodiments, a directory server is configured to route communications among the passive MFA server, the ACS, and the merchant site (or other system requesting authentication of the online user).

In an example embodiment, the passive MFA client automatically installs in a web browser executing on the online user's user computing device when the online user navigates to a remote site, such as a merchant website for online shopping. More specifically, the passive MFA client is implemented by, for example, a set of JavaScript API code. In other example embodiment ("app embodiments") the online user interacts with the remote site via a mobile application ("app") and, in such embodiments, the passive MFA client automatically installs on the online user's user computing device when the online user installs the app from an app store. For example, the passive MFA client is implemented by, for example, a set of SDK code.

In web browser embodiments, throughout the online shopping interactions between the online user's computing device and the remote site after the online user logs into the remote site, the passive MFA client passively makes, for example, API calls to collect device data of the online user's computing device (e.g., device ID, device type, device browser, and browser IP address), the online user's passive biometrics data (e.g., keystroke and mouse clicking patterns), and, in some embodiments, online user's behavioral data (e.g., frequency of logins and average time spent on each page) that are detected by the online user's computing device, and makes API calls to transmit the passively collected data to the passive MFA server.

Alternatively, in app embodiments, the passive MFA client makes, for example, SDK calls to collect device data (e.g., device ID, device platform, device OS version, device time zone, device name, device IP address), the online user's passive biometrics data (e.g., tap patterns, scroll patterns, fling patterns, pinch patterns, and device orientation), and, in some embodiments, online user's behavioral data from the online user's mobile device.

In the example embodiment, in response to the device data, online user's passive biometric data, and user behavioral data passively transmitted from the passive MFA client, the passive MFA server creates predictive models (e.g., machine learning models) and continuously trains the models with the transmitted data until the models become suitably trained. More specifically, a user profile model identified by an account identifier (e.g., the online user's login) is created and trained by the passive MFA server to predict a probability ("user authentication confidence score") that a current online user on the remote site is actually the authentic payment account holder that has historically logged in in association with the account identifier. Additionally, a device profile model identified by the same account identifier is created and trained by the passive MFA server to predict a probability ("device authentication confidence score") that the online user's computing device is one of the user computing devices historically used by the authentic payment account holder in association with the account identifier.

In the example embodiment, as the online user proceeds to initiate a payment transaction by providing payment card information as part of the online shopping checkout process on the remote site, the remote site, in response, seeks to authenticate the current user as the authorized holder of the proffered payment card by sending a signal to the ACS or, in various embodiments, directly to the passive MFA server or to a directory server configured to route authentication communications between the remote site, the ACS, and the passive MFA server.

For example, in some configurations, the merchant website communicates with the ACS, either directly or via the directory server, to authenticate payment transactions. The ACS responds with an "authenticated" or "not authenticated" user authentication response based on a user authentication confidence score and a device authentication confidence score the ACS receives, either directly or via the directory server, from the passive MFA server. More specifically, in some cases, the ACS may determine the authentication confidence scores are sufficient to authenticate the online user passively, that is, based solely on the user authentication confidence score and a device authentication confidence score returned from the passive MFA server. In response, the ACS transmits an "authenticated" user authentication response to the merchant website, either directly or through the directory server, without requiring active authentication steps from the online user. In other cases, the ACS may determine the authentication confidence scores returned from the passive MFA server insufficient to authenticate the online user passively and, in response, require active authentication steps, such as a response to a step-up challenge, to be performed by the online user.

Furthermore, the passive MFA server updates the user profile model or the device profile model, for example, at least each time a "false negative" prediction is produced. More specifically, each time the ACS determines an authentication confidence score insufficient to authenticate the online user passively and then the online user's identity is successfully verified nonetheless by the online user's response to an active authentication challenge, the passive MFA server updates the model in question accordingly with the online user's passive biometrics data or device data from the current online session. At least in this manner, the models' prediction accuracy is continuously improved by new training data over time after the models initially become validated to be suitably accurate as described above.

In the example embodiment, in response to an "authenticated" authentication response, the merchant website communicates with an acquirer computing device, or via other payment authorization processing configurations associated with an acquirer, to obtain authorization of the payment card transaction by the issuer. The acquirer computing device communicates with an issuer computing device through a payment network to obtain an "accepted" or "declined" authorization response from the issuer computing device. In the example embodiment, the issuer computing device determines whether to authorize or decline the transaction at least by checking whether the payment card account is in good standing and has a sufficient balance to cover the transaction amount. In response, the acquirer computing device forwards the "accepted" or "declined" authorization response to the merchant website.

The technical problems addressed by the MFA systems and methods of the disclosure include at least one of: (i) transaction delay or incompletion due to friction caused by active authentications, (ii) elevated network usage due to repeated transmission of active authentication data, and (iii) reduced network security due to network communications exposure of active authentication data.

A technical effect of the systems and processes described herein is achieved by a passive MFA server by steps including one or more of: (i) receiving, from a user computing device, passive biometrics data, device data, and optionally user behavioral data collected during a current session of the user computing device on a remote site; (ii) in response to a user authentication request for a current payment transaction, submitting the passive biometrics data and, optionally, the user behavioral data to a user profile model, and in response receiving a user authentication confidence score; (iii) submitting the device data to a device profile model, and in response receiving a device authentication confidence score; (iv) transmitting the user authentication confidence score and the device authentication confidence score to an ACS, wherein the ACS determines that the user authentication confidence score and the device authentication confidence score satisfy a predefined threshold for passively authenticating a user of the user computing device during the current session, and transmits, to the remote site in response to the determination and without conducting an active authentication process with the user, an indication that the user is authenticated for the current payment transaction; (v) receiving, prior to the current session of the user computing device on the remote site, a first plurality of passive biometrics data and a first plurality of device data collected during at least one previous session of the user computing device on the remote site; (vi) in response to receiving the first plurality of passive biometrics data and the first plurality of device data, generating and transmitting training data signals to the user profile model and the device profile model; (vii) applying, prior to the current session of the user computing device on the remote site, the training data signals in a process of training the user profile model and the device profile model; (viii) receiving, from the user computing device subsequent to the current session, second passive biometrics data and second device data collected during a second session of the user computing device on the remote site; (ix) receiving a second user authentication request for a second payment transaction; (x) submitting the second passive biometrics data to the user profile model, and in response receiving a second user authentication confidence score; (xi) submitting the second device data to the device profile model, and in response receiving a second device authentication confidence score; (xii) transmitting the second user authentication confidence score and the second device authentication confidence score to the ACS, wherein the ACS determines that the second user authentication confidence score and the second device authentication confidence score do not satisfy the predefined threshold for passively authenticating the user of the user computing device, and initiates, in response to the determination that the predefined threshold is not met, an active authentication process with the user computing device, authenticates the user based on a result of the active authentication process, transmits, to the merchant website in response to the authentication via the active authentication process with the user, an indication that the user is authenticated for the second payment transaction, and (xiii) receiving, from the ACS, the result of the active authentication process, and in response generating additional training data signals based on the result, the second passive biometrics data, and the second device data; and transmitting the additional training signals to the user profile model and the device profile model for further training of the user profile model and the device profile model.

The resulting technical benefits achieved by the MFA systems and methods disclosed herein include at least one of: (i) elimination of friction caused by active MFA authentications, which results in reduced delay and/or reduced cancellation of transactions, (ii) reduced network bandwidth usage due to reduced transmission of active MFA authentication data, and (iii) enhanced network security due to reduced exposure of active MFA authentication data in network traffic.

Described herein are computer systems such as the passive MFA server and the ACS. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "payment account," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. In addition, consumer card account behavior can include but is not limited to purchases, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

FIG. 1 is a schematic diagram illustrating an example embodiment of a system 100 for authenticating payment transactions using passive Multi-Factor Authentication (MFA). In particular, system 100 includes an Access Control Server (ACS) 140 and a passive MFA server 130.

In the example embodiment, a user computing device 110 is a computer that includes a web browser or a software application, which enables user computing device 110 to access remote computer devices, such as a remote site 120, illustrated here as a merchant website, and passive MFA server 130, using the Internet or other network. User computer device 110 includes a passive MFA client 111, which is a software application that may be embedded, for example, in a web browser or a mobile application executing on user computing device 110. For example, a user 160 (e.g., a cardholder), using user computing device 110, may engage in online activities (e.g., online shopping) on merchant website 120. Throughout the online activities, passive MFA client 111, to prepare for a passive payment authentication process, may passively collect passive biometrics data (such as passive biometrics data 241 shown in FIG. 2) and device data (such as device data 240 shown in FIG. 2) associated with the online activities from user computing device 110, and may transmit the collected data to passive MFA server 130. Moreover, the data collection may be substantially continuous throughout the interaction of user 160 with merchant web site 120, resulting in a rich data set. In some embodiments, user behavioral data (such as user behavioral data 242 shown in FIG. 2) is also collected and transmitted. At the end of the online activities, user 160, using user computing device 110, may initiate a payment transaction on merchant website 120.

User computing device 110 may be communicatively coupled to the Internet through one or more interfaces including, but not limited to, a local area network (LAN), a wide area network (WAN), an integrated services digital network (ISDN), a dial-up-connection, a digital subscriber line (DSL), a cellular phone connection, and a cable modem. User computing device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the example embodiment, remote site 120 is an online shopping website that is reachable through computers that include a web browser or a software application (e.g., a mobile application), such as user computing device 110, using the Internet or other network. More specifically, merchant website 120 allows user 160 to purchase goods and/or services online using user computing device 110. Merchant website 120 may be hosted on one or more computers that are communicatively coupled to the Internet through one or more interfaces including, but not limited to, a local area network (LAN), a wide area network (WAN), or an integrated services digital network (ISDN), a dial-up-connection, a digital subscriber line (DSL), a cellular phone connection, and a cable modem. Computing devices hosting merchant website 120 may be any device capable of hosting a website accessible via the Internet. In the example embodiment, merchant website 120 is associated with merchant 170.

In the example embodiment, passive MFA server 130 hosts software applications on computers on premise, in a private cloud, or in a public cloud. More specifically, passive MFA server 130 may be communicatively coupled to the Internet through one or more interfaces including, but not limited to, a local area network (LAN), a wide area network (WAN), or an integrated services digital network (ISDN), a dial-up-connection, a digital subscriber line (DSL), a cellular phone connection, and a cable modem. Accordingly, passive MFA server 130 is enabled to communicate with remote computer devices, such as merchant website 120 and user computing device 110.

In the example embodiment, merchant website 120 includes a payment authentication component 121, which is a software component configured to communicate with external computing devices, such as ACS 140 and/or passive MFA server 130, to authenticate (i.e., verify an identity of) user 160 before authorizing a payment from the payment account proffered by user 160. Merchant website 120 also includes payment authorization component 122, which is also configured to communicate with external computing devices, such as an acquirer computing device 190, to authorize payments. In some embodiments, payment authentication component 121 and payment authorization component 122 may be functionally combined into one component. In other embodiments, payment authentication component 121 and/or payment authorization component 122 may be hosted separately from merchant website 120 and only communicatively coupled with merchant website 120.

In the example embodiment, payment authentication component 121, executing on remote site 120, communicates with ACS 140 and/or passive MFA server 130 to authenticate payment transactions. In some embodiments, passive MFA server 130 may be used for authenticating payment transactions in concert with ACS 140. In other embodiments, passive MFA server 130 may be used for authenticating payment transactions in place of ACS 140 when, for example, ACS 140 is temporarily unavailable or no ACS is associated with an issuer bank (or "issuer") 180 of the proffered payment account. Alternatively, ACS 140 and passive MFA server 130 may be configured in any suitable fashion to communicate with payment authentication component 121 to authenticate payment transactions, such as via a directory server (such as directory server 250 shown in FIG. 2).

In the example embodiment, issuer computing devices 150 are each associated with an issuer 180 and capable of accessing remote computer devices, such as ACS 140, using the Internet or other network. For example, issuer 180 may host ACS 140 along with issuer computing device 150, or may contract with a third-party ACS provider to operate ACS 140. ACS 140 is configured to authenticate, when user 160 proffers a payment account held by an account holder at issuer 180, that user 160 is indeed an authorized user of the proffered account (i.e., that the proffered account is not being used fraudulently by another). More specifically, issuer computing devices 150 may be communicatively coupled to the Internet through one or more interfaces including, but not limited to, a local area network (LAN), a wide area network (WAN), or an integrated services digital network (ISDN), a dial-up-connection, a digital subscriber line (DSL), a cellular phone connection, and a cable modem.

For an example, as user 160 proceeds to initiate a payment transaction by providing payment card information as part of the online shopping checkout process, payment authentication component 121 may first transmit a user authentication request to ACS 140, including user authentication data, such as transaction data (e.g., information about the payer, the payment card, and the merchant) and device data programmatically collected from user computing device 110 (e.g., information about the web browser and mobile device settings). In some embodiments, payment authentication component 121 transmits a user authentication request to ACS 140 via a directory server as described above. In the example embodiment, in response to the user authentication request from payment authentication component 121, ACS 140 may make an MFA user authentication determination by first transmitting a user authentication confidence score request and a device authentication confidence score request to passive MFA server 130. ACS server 140 then receives, in response, the user and device authentication confidence scores from passive MFA server 130. In some embodiments, the user authentication confidence score is generated additionally based on user behavioral data. In the example embodiment, ACS 140 may determine the authentication confidence scores received from passive MFA server 130 are sufficient to authenticate user 160 passively and, in response, transmit an "authenticated" user authentication response to payment authentication component 121 implemented on merchant website 120 without requiring active authentication steps from user 160, such as a step-up challenge or iris scan. In effect, ACS 140 has performed payment authentication in concert with passive MFA server 130 by adopting the passive MFA results generated by passive MFA server 130.

Alternatively, ACS 140 may determine the authentication confidence scores received from passive MFA server 130 are insufficient to authenticate user 160 passively and, in response, may require active authentication steps to be performed by user 160, for example by transmitting a step-up challenge and/or a request for an iris scan to user computing device 110. In such case, ACS 140 may, in response to the step-up challenge results received from user computing device 110, transmit an "authenticated" or "not authenticated" user authentication response to payment authentication component 121 implemented on merchant website 120 accordingly. In effect, ACS 140 has performed payment authentication in concert with passive MFA server 130 by evaluating the passive MFA results generated by passive MFA server 130 and deciding to further authenticate user 160.

Alternatively, where payment authentication component 121 transmits a user authentication request to ACS 140 via a directory server, the directory server, instead of ACS 140, may request user authentication confidence scores from passive MFA server 130 before ACS 140 determines, based on the scores, whether to require active authentication steps to be performed by user 160. More specifically, the directory server may first request user authentication confidence scores from passive MFA server 130 and, in response, include the scores in the user authentication request received from payment authentication component 121 when forwarding the request to ACS 140. In response, ACS 140, without requesting user authentication confidence scores again, determines, based on the scores received via the directory server, whether to transmit a step-up challenge to user computing device 110 or instead transmit an "authenticated" user authentication response, via the directory server, to payment authentication component 121. In effect, ACS 140 has performed payment authentication in concert with passive MFA server 130 by either adopting the passive MFA results received from the directory server, or taking further steps to authenticate user 160 based on the results. In the example, in response to receiving an "authenticated" user authentication response at merchant website 120, payment authorization component 122, executing on merchant website 120, proceeds to request payment authorization from acquirer computing device 190 with an "authenticated" authentication status.

For another example, as user 160 proceeds to initiate a payment transaction by providing payment card information as part of the online shopping checkout process, payment authentication component 121, executing on merchant website 120, may first attempt to transmit a user authentication request to ACS 140 but then detect that either ACS 140 is temporarily unavailable (due to, e.g., system failures of ACS 140 or network connection failures between payment authentication component 121 and ACS 140), or issuer 180 does not operate an ACS and does not use an ACS provider. In response, payment authentication component 121 may directly request a user authentication confidence score and a device authentication confidence score from passive MFA server 130 and determine if the authentication confidence scores received from passive MFA server 130 are sufficient to authenticate user 160 passively. In some embodiments, the user authentication confidence score is generated additionally based on user behavioral data.

In some embodiments, payment authentication component 121 attempts to identify and communicate with the appropriate ACS 140 via a directory server (as described in the previous example). In such embodiments, the directory server, instead of payment authentication component 121, may request user authentication confidence scores from passive MFA server 130 after detecting the unavailability of an ACS. More specifically, the directory server may first request authentication confidence scores from passive MFA server 130 and, in response, include the scores in an "attempted" user authentication response when transmitting the response to payment authentication component 121.

In some cases, payment authentication component 121 may determine the received user authentication scores are sufficient to authenticate user 160 passively and, in response, payment authorization component 122, executing on merchant website 120, may proceed to request payment authorization from acquirer computing device 190 with an "authenticated" authentication status. In other cases, payment authentication component 121 may determine the scores are insufficient to authenticate user 160 passively and, in response, proceed no further. In still other cases, payment authentication component 121 may not independently determine if the scores are sufficient to authenticate user 160 passively and simply proceed to request payment authorization from acquirer computing device 190 with an "attempted" authentication status. The "attempted" authentication status, when transmitted to acquirer computing device 190, indicates to acquirer computing device 190 (and by extension to acquirer 192) merchant website 120 (and by extension merchant 170) has made a good faith attempt to authenticate the payment being authorized, which is distinguishable from a failed authentication, i.e., a "not authenticated" authentication status.

In the example embodiment, acquirer computing devices 190 are capable of accessing remote computer devices, such as merchant website 120 and issuer computing device 150 (via a payment network 160), using the Internet or other network. Acquirer computing device 150 is associated with an acquirer bank (or "acquirer") 192 and operates to process payment authorization through a payment interchange network. Alternatively, acquirer 192 may contract with a third-party payment processor to process payment authorization. Still additionally or alternatively, acquirer 192 may contract with a third-party payment gateway to the payment interchange network to process payment authorization specifically for online transactions, such as the online transactions on merchant website 120.

In the example embodiment, when payment authorization component 122, executing on merchant website 120, requests payment authorization from acquirer computing device 190, payment authorization component 122 specifically initiates a payment authorization request message to acquirer computing device 190. Acquirer computing device 190 initiates payment authorization communications with issuer computing device 150 through a payment network 160. In response to the payment authorization request message, issuer computing device 150 verifies that the identified payment account is in good standing and has an available balance sufficient to cover the transaction. Based on the result of the verification, issuer computing device 150 sends an "accepted" or "declined" authorization response message via payment network 160 to acquirer computing device 190, which forwards the message to payment authorization component 122 on merchant website 120.

Figure 2:
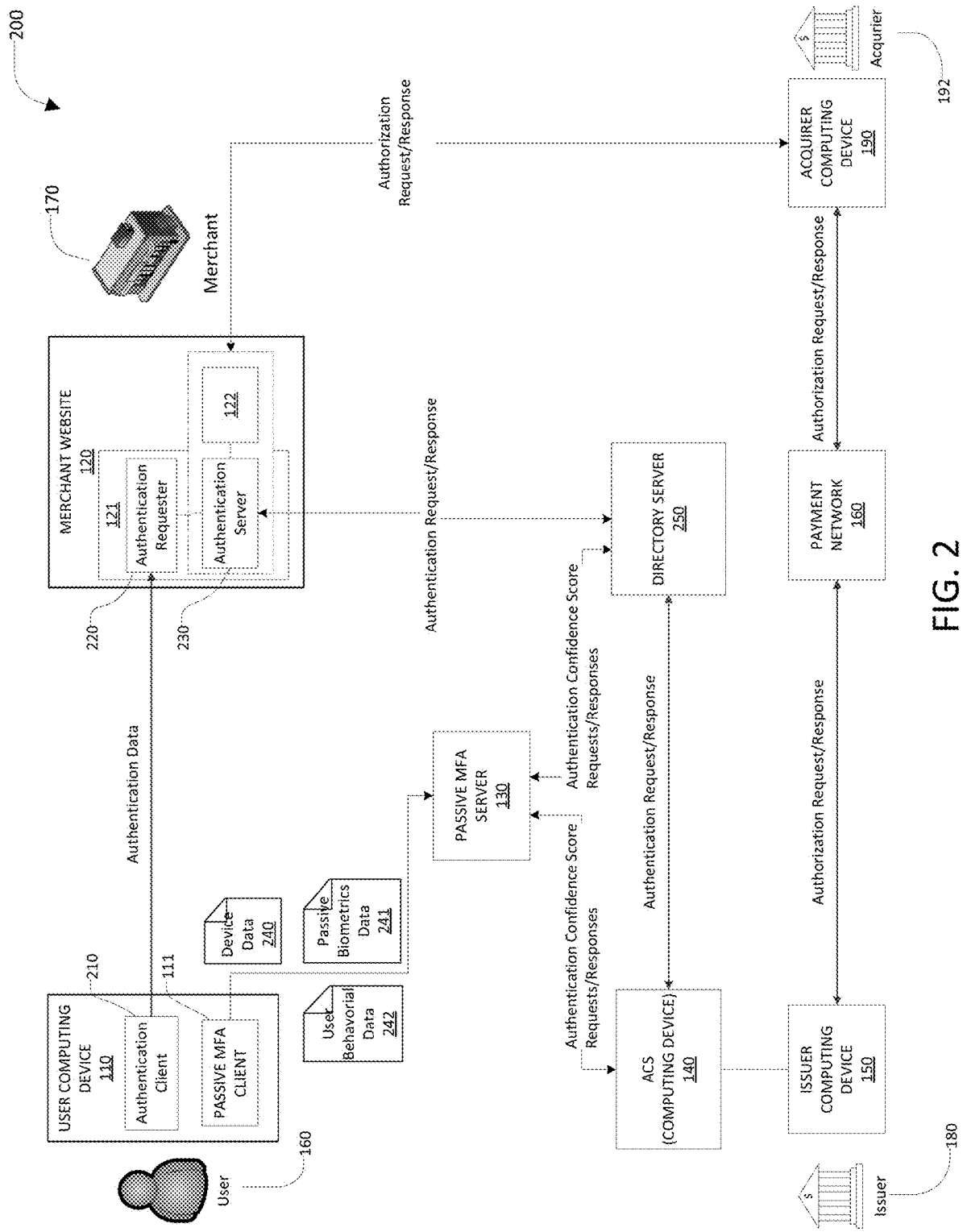
FIG. 2 is a schematic diagram illustrating communications in an example payment transaction authentication process using the passive MFA server and passive MFA client of FIG. 1.

FIG. 2 is a schematic diagram illustrating transaction flow 200 in an example payment transaction authentication process using passive MFA server 130 and passive MFA client 111. In the example embodiment, ACS 140 and directory server 250 implement the 3DS 2 protocol provided by EMV®. EMV is a registered trademark of EMVCo, LLC of Foster City, California. In alternative embodiments, ACS 140 and directory server 250 are implemented using any suitable protocol.

In the example embodiment, passive MFA client 111 automatically installs on user computing device 110 at the initial interaction between user computing device 110 and merchant website 120. For example, in some embodiments, user 160, using a web browser executing on user computing device 110, may navigate to merchant website 120 for online shopping. More specifically, the web browser requests the content and other resources associated with the URL of the landing page of merchant website 120. In response, along with the content and other resources related to online shopping, merchant website 120 transmits to the web browser passive MFA client 111, which may be, for example, a set of JavaScript code that includes, for example, (i) API libraries for collecting data locally from the web browser and the surrounding computing environment on user computing device 110 ("data collection APIs"); (ii) API libraries for transmitting locally collected data to passive MFA server 130 ("data transmission APIs"); and (iii) scripting calls that invoke the data collection APIs and the data transmission APIs. In other words, passive MFA client 111 is downloaded automatically to the web browser and ready to programmatically interact locally with the web browser and remotely with passive MFA server 130.

For another example, in other embodiments, user 160 may choose to do online shopping in the mobile application version of remote site 120 ("app"). In such embodiments, user 160 installs the app from an app store (e.g., Google Play for android devices or App Store for iOS devices) on user computing device 110. As part of the installation of the app, along with all the components related to online shopping, the installation includes passive MFA client 111, which may be, for example, a set of SDK code that, similar to the previous example, includes, for example, (i) data collection SDKs for collecting data locally from user computing device 110; (ii) data transmission SDKs for transmitting collected data to passive MFA server 130; and (iii) SDK calls that invoke the data collection SDKs and the data transmission SDKs. In other words, passive MFA client 111 is installed as part of the app on user computing device 110 and ready to programmatically interact locally with online shopping components of the app and remotely with passive MFA server 130.

In the example embodiment, throughout the online shopping interactions between user computing device 110 and merchant website 120 after user 160 logs into merchant website 120 with an account identifier (e.g., a login ID, such as an email or a user-created user ID), passive MFA client 130 passively collects device data 240 of user computing device 110 and passive biometrics data 241 detected by user computing device 110 and then transmits the passively collected data to passive MFA server 130. The term "passively" in this context indicates that, at least after initial installation of passive MFA client 111, neither passive MFA client 111 nor ACS 140 gives prompts to, or requires additional action or direct input from, user 160 to initiate collection and transmission of device data 240 and passive biometrics data 241, and to authenticate user 160 based on the transmitted data. Rather, device data 240 and passive biometrics data 241 are collected passively, i.e., in the background, during user's 160 routine interaction with merchant website 120, and used to authenticate user 160 as the valid user of the payment account presented for the transaction, without any noticeable impact on user's 160 experience using merchant website 120. In some embodiments, passive MFA client 111 further passively collects user behavioral data 242 and transmits passively collected user behavioral data 242, along with device data 240 and passive biometrics data 241, to passive MFA server 130 for use in the passive authentication process.

For an example, while user computing device 110 interacts with merchant website 120 via a web browser executing on user computing device 110, passive MFA client 111 collects device data 240, such as one or more of the following: device ID (e.g., hardware ID for PC, IMEI for iOS devices), device type (e.g., desktop, mobile device), device platform (e.g., Windows 10, Apple MacOSX), device browser (e.g., IE10, Chrome 49), browser IP address, browser time zone, browser user-agent, browser screen width, browser height, and browser language. For another example, while user computing device 110 interacts with the app executing on user computing device 110, passive MFA client 111 collects device data 240, such as the following: device ID (e.g., IMEI for iOS devices), device platform (e.g., Android, iOS), device OS version, device time zone, device name (i.e., user-assigned device name), device screen resolution, device IP address, device latitude, and device longitude.

Additionally, in an example, while user computing device 110 interacts with merchant website 120 via a web browser, passive MFA client 111 collects passive biometrics data 241, such as one or more of keystroke patterns and mouse click patterns. In another example, while user computing device 110 interacts with the app, passive MFA client 111 collects passive biometrics data 241, such as tap patterns (e.g., duration, pressure, coordinate), scroll patterns, fling patterns (e.g., swiping used when flipping pages of an e-book), pinch patterns, and device orientation of user computing device 110. As noted above, in some embodiments, passive MFA client 111 collects passive biometrics data 241 substantially continuously throughout the interaction of user computing device 110 with merchant website 120.

Additionally, in some examples, passive MFA client 111 further collects user behavioral data 242, such as the frequency of logins to remote site 120, the average time spent on each page during navigation, and the typical range of purchase amount and number of items purchased by user 160 at remote site 120. While user behavioral data 242 may not strictly be considered biometric data, i.e., may not alone be sufficient to uniquely identify user 160, user behavioral data 242 may add accuracy to user profile model 350 (discussed below) in some cases.

In the example embodiment, in response to the device data 240, passive biometrics data 241, and in some embodiments user behavioral data 242 passively transmitted from passive MFA client 111, passive MFA server 130 generates machine learning predictive models and trains the models with the data until the models become suitably "trained" More specifically, a user profile model (such as user profile model 350 shown in FIG. 3) identified by an account identifier is created and trained by passive MFA server 130 (described further in FIG. 3) to predict a probability ("user authentication confidence score") that the currently logged-in user on merchant website 120 is actually the same valid user 160 that has previously logged in in association with the account identifier. Additionally, a device profile model (such as device profile model 360 shown in FIG. 3) identified by the same account identifier is created and trained by passive MFA server 130 (described further in FIG. 3) to predict a probability ("device authentication confidence score") that the user computing device 110 used by the currently logged-in user is one of the user computing devices previously used by the valid user 160 in association with the account identifier. The above models can be implemented using any suitable machine learning algorithm, such as, for example, decision tree algorithms, support vector machine ("SVM") algorithms, and ensemble algorithms (e.g., random forest, AdaBoost, and gradient boosting machines ("GBM")).

In the example embodiment, as user 160 proceeds to initiate a payment transaction by providing payment card information as part of the online shopping checkout process, an authentication client 210 (e.g., such as a 3DS client executing the 3DS 2 protocol) collects all the authentication data from user computing device 110 required by any payment authentication protocols, such as the 3DS 2 protocol, and transmits the collected authentication data to an authentication requester 220 (e.g., such as a 3DS requester executing the 3DS 2 protocol). According to the 3DS 2 protocol, authentication client 210 is installed locally on user computing device 110 and authentication requester 220 is associated with merchant website 120. In the example embodiment, the combination of authentication requestor 220 and an authentication server 230 (e.g., such as a 3DS server executing the 3DS 2 protocol) implements payment authentication component 121 of merchant website 120 according to the 3DS 2 protocol. In some embodiments, authentication server 230 may be hosted separately from merchant website 120 and only communicatively coupled with merchant website 120. In the example embodiment, authentication server 230 also implements payment authorization component 122 of merchant website 120 according to the 3DS protocol. Alternatively, payment authorization component 122 maybe implemented separately from authentication server 230.

In the example embodiment, authentication server 230 communicates with ACS 140, passive MFA server 130, and directory server 250 to authenticate payment transactions using 3DS 2 messaging formats in all the configurations in different embodiments described in FIG. 1 where a directory server is part of the configuration. More specifically, in some embodiments, authentication server 230 may communicate with ACS 140, via directory server 250, to authenticate payment transactions where ACS 140 transmits, via directory server 250, to authentication server 230 an "authenticated" or "not authenticated" user authentication response based on a user authentication confidence score and a device authentication confidence score ACS 140 directly received from passive MFA server 130.

In other embodiments, authentication server 230 may communicate with ACS 140, via directory server 250, to authenticate payment transactions where ACS 140 transmits, via directory server 250, to authentication server 230 an "authenticated" or "not authenticated" user authentication response based on a user authentication confidence score and a device authentication confidence score generated by passive MFA server 130 that is forwarded from directory server 250.

In still other embodiments, authentication server 230 may communicate with directory server 250 only (i.e., not with ACS 140 directly or indirectly) to authenticate payment transactions where directory server 250 transmits to authentication server 230 an "attempted" user authentication response, along with a user authentication confidence score and a device authentication confidence score directory server 250 received from passive MFA server 130, after directory server 250 detects either unavailability of ACS 140 or nonexistence of an ACS.

In the example embodiment, in response to an "authenticated" or, in some cases, an "attempted" authentication response, authentication server 230 or, in the alternative embodiments as described above, payment authorization component 122 communicates with acquirer computing device 190 or via other payment authorization processing configurations associated with acquirer 192 to process payment authorization as described in FIG. 1. Acquirer computing device 190 communicates with issuer computing device 150 through payment network 160 to obtain an "accepted" or "declined" authorization response from issuer computing device 150, as described in FIG. 1. In response, as described in FIG. 1, acquirer computing device 190 forwards the "accepted" or "declined" authorization response to authentication server 230 or, alternatively, to payment authorization component 122.

Figure 3:
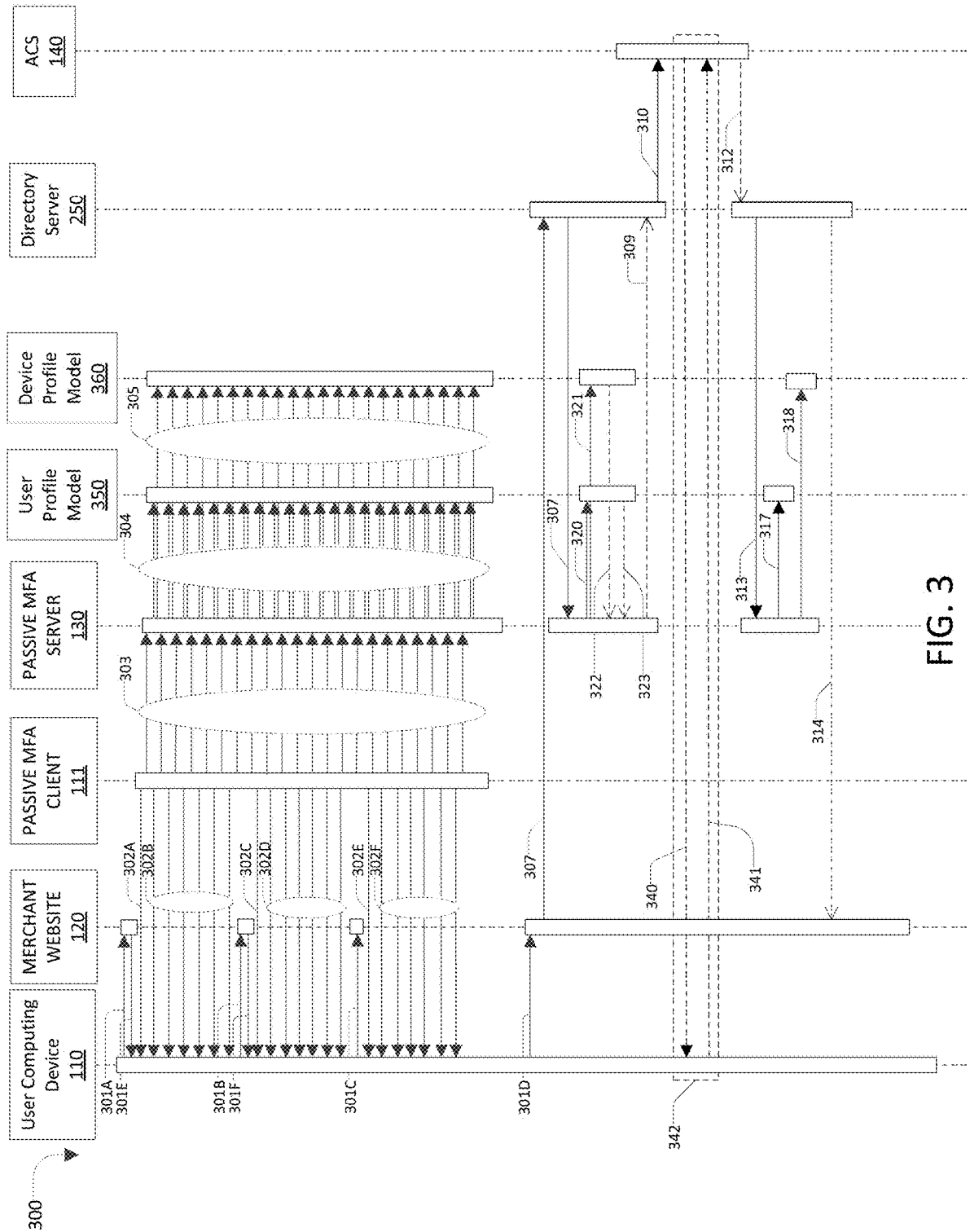
FIG. 3 is a schematic signal flow diagram for the example payment transaction authentication process shown in FIG. 2.

FIG. 3 is a data flow diagram 300 for the example payment transaction authentication process shown in FIG. 2. In the example, user 160, using user computing device 110, interacts with remote site 120, such as a merchant website, via a web browser on user computing device 110, or alternatively via the app on user computing device 110, as described above. User 160 may log into remote site 120 with an account identifier as described in FIG. 2

For ease of description, the example data flow will be described with respect to user 160 conducting online shopping within the app. However, the description also is applicable, with suitable modifications known to those of skill in the art, to embodiments in which user 160 conducts online shopping using a web browser on user computing device 110 (for example, certain data signals discussed below would be understood to represent API calls rather than SDK calls).

Also for ease of description, the example data flow will be described with respect to embodiments which include directory server 250 routing communications among payment authentication component 121 of merchant website 120, passive MFA server 130, and ACS 140. However, the description also is applicable, with suitable modifications known to those of skill in the art, to embodiments in which no directory server is implemented (for example, payment authentication component 121 and passive MFA server 130 communicate directly with ACS 140).

In the example embodiment, user 160, using the app on user computing device 110, may, for example, enter the product name for a desired product (e.g., "security camera") in the search input box on a "product search" screen in the app by tapping input on the onscreen keyboard and tapping on the "search" button on the onscreen keyboard. The tap triggers a search request to merchant website 120 and is represented by data signal 301A transmitted to merchant website 120. Merchant website 120, in response, transmits a first subset of products matching the search query (e.g., the first 50 results of a full set of 200 results) to the app's "search results" screen, which, in response, displays a second subset of the search results (e.g., the first five results) that would fit in the search results screen, sorted, for example, in a default sorting order (e.g., by relevance). Merchant website's 120 response is represented by data signal 301E transmitted to user computing device 110.

In addition, user's 160 tapping gestures to enter search input and submit the search request programmatically initiate data signal 302A, which represents passive MFA client's 111 SDK calls as described above to programmatically passively collect passive biometrics data 241 (e.g., user 160's speed and force patterns for the tapping touch gestures here), device data 240, and, in some embodiments, user behavioral data 242, from user computing device 110. Passive MFA client 111 subsequently passively transmits the collected data to passive MFA server 130, which is represented within plurality of data signals 303. Data signals 303 are illustrated as a general plurality of data signals to illustrate that data signals 303 need not correspond to SDK calls, such as data signals 302A or other SDK calls discussed below, on a one-to-one basis. Rather, in at least some instances, passive MFA client 111 may batch data collected by multiple ones of the SDK calls into a single one of signals 303.

In the example embodiment, a series of subsequent user 160 interactions with user computing device 110 during the session on remote site 120 programmatically trigger a plurality of passive data collections from user computing device 110 by passive MFA client 111, illustrated by data signals 302B, and subsequent programmatically triggered transmissions of the collected data 240 and 241 and, in some embodiments, data 242 from passive MFA client 111 to passive MFA server 130, illustrated within plurality of data signals 303. For example, in response to display of the second subset of retrieved product results on user computing device 110 as discussed above, user 160, using computing device 110, may touch the touchscreen of user computing device 110 in various gestures while viewing the results. For an example, user 160 may scroll down the list of product results by swiping up to view more product results initially hidden below the touch screen (i.e., the sixth result through the 50$^{th}$ result). User 160 may also scroll up by swiping down to view previously reviewed results. For another example, user 160 may intend to scroll down at first but then not move the finger after pressing on the touchscreen (e.g., a result that earlier escaped user's 160 attention caught user's 160 attention after user 160 decided to scroll down), resulting in a long press. For another example, user 160 may desire to see a product's description more closely and double tap the description area to zoom in on the description. For yet another example, user 160 may desire to see an image of a product more closely and pinch the touchscreen with two fingers to zoom in and subsequently to zoom out to return the normal view. User 160 may use and/or repeat the touch gestures described here in any order that suits user's 160 viewing experience. In addition, collected passive biometrics data 240 may also include information about the orientation of user computing device 110 as user 160 interacts with user computing device 110. For example, user 160 may hold user computing device in a certain orientation or a specific range of orientations during various aspects of online shopping.

It should be understood that the number of data signals 302 and 303 shown in FIG. 3 is for illustrative purposes and is non-limiting. Nevertheless, the density of data signals 302B and 303 is intended to illustrate the idea that a substantially continuous flow of passive biometrics data 241 may be generated each time user 160 interacts with merchant website 120 using user computing device 110. Because each interaction initiated by user 160 programmatically triggers passive MFA client's 111 SDK call, i.e. data signal 302, to collect passive biometrics data 240 (e.g., data descriptive of a wide variety of different types of touch gestures and device orientations during ordinary use of user computing device 110, as described above) from user computing device 110, the collected data in signals 303 to passive MFA server 130 enables robust user profile models 350 to be created, capable of identifying nuanced patterns of device usage and handling that uniquely identify user 160.

In the example embodiment, after user 160 has viewed all 50 results of the first subset of the search results from merchant website 120, user 160 swipes up (i.e., executes a dragging gesture upward along the touch screen of user computing device 110) for more results, initiating a request for more results from merchant website 120, illustrated as data signal 301B. Merchant website 120, in response, transmits the next 50 results of the full set of 200 results to the app, represented by data signal 301F. Again, user's 160 dragging gesture triggers passive MFA client's 111 SDK calls in data signal 302C to programmatically collect additional passive biometrics data 241 (e.g., the patterns for the dragging gestures here) from user computing device 110 and subsequently transmit the collected data to passive MFA server 130 within plurality of data signals 303. Data signals 302D represent all the interactions of user 160 with user computing device 110 while user 160 views the second 50 search results or, after scrolling back up, views the first 50 search results again. Again, passive MFA client 111 passively and subsequently transmits collected data 240 and 241 and, in some embodiments, data 242 to passive MFA server 130 within plurality of data signals 303. Similar data signals may continue to be generated until user 160, for example after having viewed a sufficient number of search results, selects a product to purchase from the app, generating signal 301C. Again, user's 160 tapping gesture for the purchase that generates signal 301C also triggers passive MFA client's 111 SDK calls in data signal 302E and subsequent transmission of collected data to passive MFA server 130 within plurality of data signals 303.

In some embodiments, prior to the actual purchase selection, user 160 first requests additional product details by tapping into the displayed product on the search results screen. Merchant website 120, in response, transmits the requested additional product details to the app's product details screen. Data signals 302F further represent SDK calls from passive MFA client 111 to collect data during the interactions user 160 initiates while user 160 views the product details, for example to confirm the interest to purchase the product. Again, data 240 and 241 and, in some embodiments, data 242 returned in response to data signals 302F is subsequently transmitted to passive MFA server 130 within plurality of data signals 303.

Although certain specific interactions of user 160 with the app are described above for purposes of illustration, it should be understood that, additionally or alternatively, data signals 302 may represent SDK calls for collection of data 240 and 241 and, in some embodiments, data 242 during any suitable interaction of user 160 with user computing device 110 executing the app, with the collected data being included in data signals 303.

In the example embodiment, in response to the data passively transmitted from passive MFA client 111 in data signals 303, passive MFA server 130 generates training data signals 304 and training data signals 305 to train user profile model 350 and device profile model 360, respectively, with the transmitted data. More specifically, training data signals 304 are applied in a suitable process of training user profile model 350 and evaluating the model's performance to ensure that user profile model 350 generates a suitably accurate user authentication confidence score. Similarly, training data signals 305 are applied in a suitable process of training device profile model 350 and then evaluating the model's performance to ensure device profile model 360 generates a suitably accurate device authentication confidence score. For some first-time users 160, one or both of user profile model 350 and device profile model 360 may become suitably trained based on data 240 and 241 and, in some embodiments, data 242, collected by SDK calls 302 during a single on-line shopping session, if sufficient training data is collected by passive MFA client 111 in, for example, one or more of data signals 302A-F resulting from relatively "dense" or extensive interactions between user 160 and user computing device 110. For other first-time users 160, multiple on-line shopping sessions may be required to suitably train one or both of user profile model 350 and device profile model 360, for example if the user's sessions include relatively "sparse" or less extensive interactions between user 160 and user computing device 110. In some embodiments, one or both of user profile model 350 and device profile model 360 are initially and/or periodically validated as suitably trained by comparing the user authentication confidence score and/or the device authentication confidence score for at least one transaction to a result of a step-up challenge by ACS 140 for the at least one transaction.

In the example embodiment, user profile model 350 and device profile model 360 are validated as accurate based at least on a first plurality of data signals 303, including a first plurality of passive biometrics data 241 and a first plurality of device data 240 and, in some embodiments, a first plurality of user behavioral data 242. After validation of the models, user 160 initiates a current on-line session with merchant website 120, during which a variety of current signals 302 and 303 may be generated as discussed above. In some embodiments, at least some current training data signals 304 and/or 305 are also generated accordingly to further train the models when the same current data signals 304 and/or 305 have first been evaluated by the models to generate an authentication confidence score meeting a predefined threshold. Following a purchase selection by user 160, user 160 proceeds to initiate a current payment transaction in the current session by providing payment card information as part of the online shopping checkout process on merchant website 120, causing the app to transmit data signal 301D, which is directed to payment authentication component 121 associated with merchant website 120. In response, authentication component 121, such as authentication server 230 executing the 3DS 2 protocol, transmits a user authentication request 307 for the current payment transaction to directory server 250.

Directory server 250 routes user authentication request 307 for the current transaction to passive MFA server 130. In response to user authentication request 307, passive MFA server 130 submits the passive biometrics data 241, and, in some embodiments, the user behavioral data 242, from current data signals 303 to user profile model 350, via data signal 320, and submits the device data 240 from the current data signals 303 to device profile model 360, via data signal 321, for evaluation by the models. In response, user profile model 350 and device profile model 360 generate and return to passive MFA server 130 a user authentication confidence score 322 and a device authentication confidence score 323, respectively for the current payment transaction. In response to the returned authentication confidence scores, passive MFA server 130 transmits data signal 309 including the authentication confidence scores to directory server 250, which forwards the scores to ACS 140 in data signal 310.

ACS 140 compares the user authentication confidence score and the device authentication confidence score to a predefined threshold for passively authenticating user 160. The predefined threshold for passively authenticating user 160 may be selected by one or more of ACS 140, issuer 180, or an operator of passive MFA server 130, for example. If one or both authentication confidence scores in data signal 310 do not satisfy the predefined threshold for passively authenticating user 160 via passive MFA server 130 for the current payment transaction, ACS 140 implements an active authentication process 342.

In the example active authentication process 342, ACS 140 may transmit an active authentication signal, or step-up challenge, 340 to user computing device 110. In response to step-up challenge 340, user computing device 110 prompts user 160 to take a responsive action with user computing device 110 that may be verified against a reference stored by, for example, issuer computing device 150. For example, step-up challenge may include one or more questions to which only the actual user 160 would be expected to know the answer, and/or a request for an active biometric identification such as an iris scan by a camera device resident on user computing device 110. User computing device 110 transmits the resulting step-up response 341 to ACS 140. After evaluating step-up response 341, such as by communicating with issuer computing device 150 to compare step-up response 341 to the stored reference, ACS 140 transmits a user authentication response 312 to directory server 250. More specifically, in response to step-up response 341 matching the reference, user authentication response 312 indicates that user 160 is "authenticated." Conversely, in response to step-up response 341 not matching the reference, user authentication response 312 indicates that user 160 is "not authenticated." In some embodiments, ACS 140 and/or directory server 250 may also transmit a data signal 313 including the results of user authentication response 312 to passive MFA server 130, and passive MFA server 130 may incorporate the results, along with data generated from current data signals 303, into additional training data signals 317 and 318 transmitted to, respectively, user profile model 350 and device profile model 360 for use in further training of the models. At least in this manner, the models' accuracy is continuously improved by new training data over time after the models initially become validated to be suitably accurate as described above.

On the other hand, if both authentication confidence scores in data signal 310 satisfy the predefined threshold for passively authenticating user 160 via passive MFA server 130 for the current payment transaction, ACS 140 in response omits active authentication process 342 and, instead, transmits the user authentication response 312 indicating "authenticated" to directory server 250, without conducting any type of step-up challenge of user 160. In other words, in response to user authentication confidence score 323 and device authentication confidence score 322 determined by passive MFA server 130 both meeting the acceptable threshold for passively authenticating user 160 for the current payment transaction, ACS 140 notifies the interested parties that user 160 is authenticated with respect to both an element of inherence (i.e., something only user 160 is, as verified from passive biometrics data 241) and an element of possession (i.e., something only user 160 possesses, namely user computing device 110, as verified from device data 240), without conducting any active authentication process 342, i.e., without transmitting prompts to user computing device 110 that require an additional, dedicated action to be taken by user 160 in order to complete the authentication process. Accordingly, passive MFA server 130 reduces or eliminates the friction associated with conventional authentication systems that require user 160 to perform active authentication steps to authenticate user 160 for a given payment transaction.

In the example embodiment, in response to receiving user authentication response 312, directory server 250 forwards the user authentication response as data signal 314 to payment authentication component 121 associated with merchant website 120. If user authentication response 312 indicates "authenticated," data signal 314 is relayed to payment authorization component 122, which initiates the payment authorization process with acquirer computing device 190, payment network 160, and issuer computing device 150, as described above. Alternatively, if user authentication response 312 indicates "not authenticated," data signal 314 causes merchant website 120 to refuse the current payment transaction by user 160 due to the corresponding potential for fraud.

In some embodiments, multiple authorized users may log into the merchant website 120 via a same user computing device 110, and/or a single authorized user may log into merchant website 120 via different user computing devices 110 in different online shopping sessions. In such cases, passive MFA server 130 is configured to detect a distinct user profile data pattern emerging based on passive biometrics data 241 and/or a distinct device profile data pattern emerging based on device data 240 transmitted from passive MFA client 111. In such cases, passive MFA server 130 may create an additional user profile model in association with the same account identifier and train the model using transmitted data that match the data pattern of the additional user profile as described above. Similarly, passive MFA server 130 may create and train an additional device profile model in association with the same account identifier. The above detection of distinct user profile data patterns or device profile data patterns can be implemented by any suitable machine learning algorithm, such as, for example, unsupervised learning algorithms (e.g., K-Nearest Neighbor ("KNN"), K-Means, and Apriori).

Figure 4:
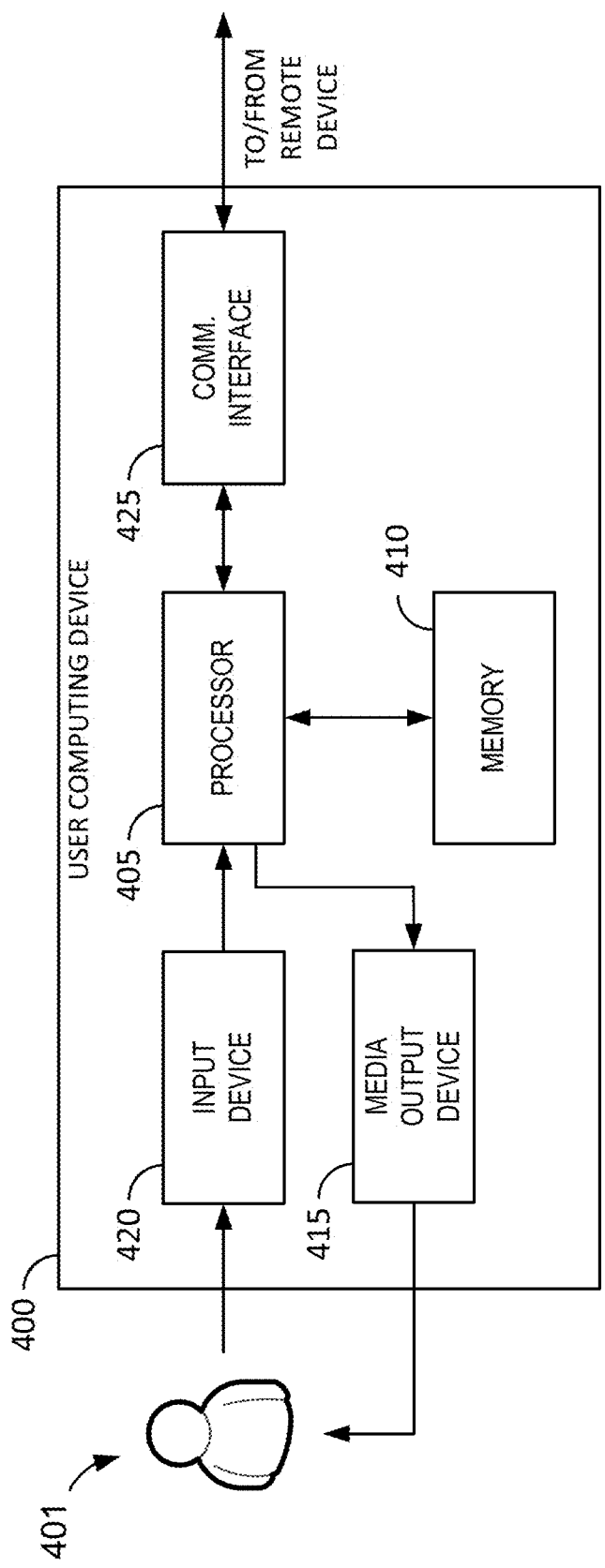
FIG. 4 illustrates an example configuration of a user computing device in accordance with embodiments of the present disclosure.

FIG. 4 illustrates an example configuration of a user computing device 400 in accordance with some embodiments of the present disclosure. In some embodiments, the user computing device 400 is used to implement the user computing device 110 shown in FIG. 1. User computer device 400 includes a processor 405 for executing instructions, and a memory area 410. In some embodiments, executable instructions are stored in memory area 410. Processor 405 may, for example, include one or more processing units (e.g., in a multi-core configuration). Memory area 410 may, for example, be any device allowing information such as executable instructions or transaction data to be stored and retrieved. Memory area 410 may further include one or more computer readable media.

In the example embodiment, user computing device 400 further includes at least one media output device 415 for presenting information to user 401 (e.g., such as user 160). Media output device 415 may, for example, be any component capable of converting and conveying electronic information to user 401. In some embodiments, media output device 415 includes an output adapter (not shown), such as a video adapter or an audio adapter, which is operatively coupled to processor 405 and operatively coupleable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output device 415 is configured to include and present a graphical user interface (not shown), such as a web browser or a client application (e.g., the app associated with remote site 120), to user 401. The graphical user interface may include, for example, an online store interface for viewing or purchasing items, or a wallet application for managing payment information. In some embodiments, user computing device 400 includes an input device 420 for receiving input from user 401. User 401 may use input device 420, without limitation, to select or enter one or more items to purchase or request to purchase, to access credential information, or to access payment information. Input device 420 may include, for example, a keyboard, a pointing device, a mouse, a stylus, a touch sensitive panel (e.g., a touch pad or a touch screen), a gyroscope, an accelerometer, a position detector, a biometric input device, or an audio input device. A single component such as a touch screen may function as both an output device of media output device 415 and input device 420.

In one embodiment, user computing device 400 further includes a communication interface 425, communicatively coupled to a remote device such as merchant website 120 shown in FIG. 1. Communication interface 425 may include, for example, a wired or wireless network adapter or a wireless data transceiver for use with a mobile telecommunications network.

In the example embodiment, memory area 410 stores computer readable instructions for providing a user interface to user 401 through media output device 415 and, optionally, for receiving and processing input from input device 420. A user interface may include, among other possibilities, a web browser or a client application. Web browsers enable users, such as user 401, to display and interact with media and other information typically embedded on a web page or a website from merchant website 120. A client application (e.g., the app) allows user 401 to interact with, for example, merchant website 120. For example, instructions may be stored by a cloud service, and the output of the execution of the instructions sent to the media output device 415.

Processor 405 executes computer-executable instructions for implementing aspects of the disclosure. In some embodiments, the processor 405 is transformed into a special purpose microprocessor by executing computer-executable instructions or by otherwise being programmed.

Figure 5:
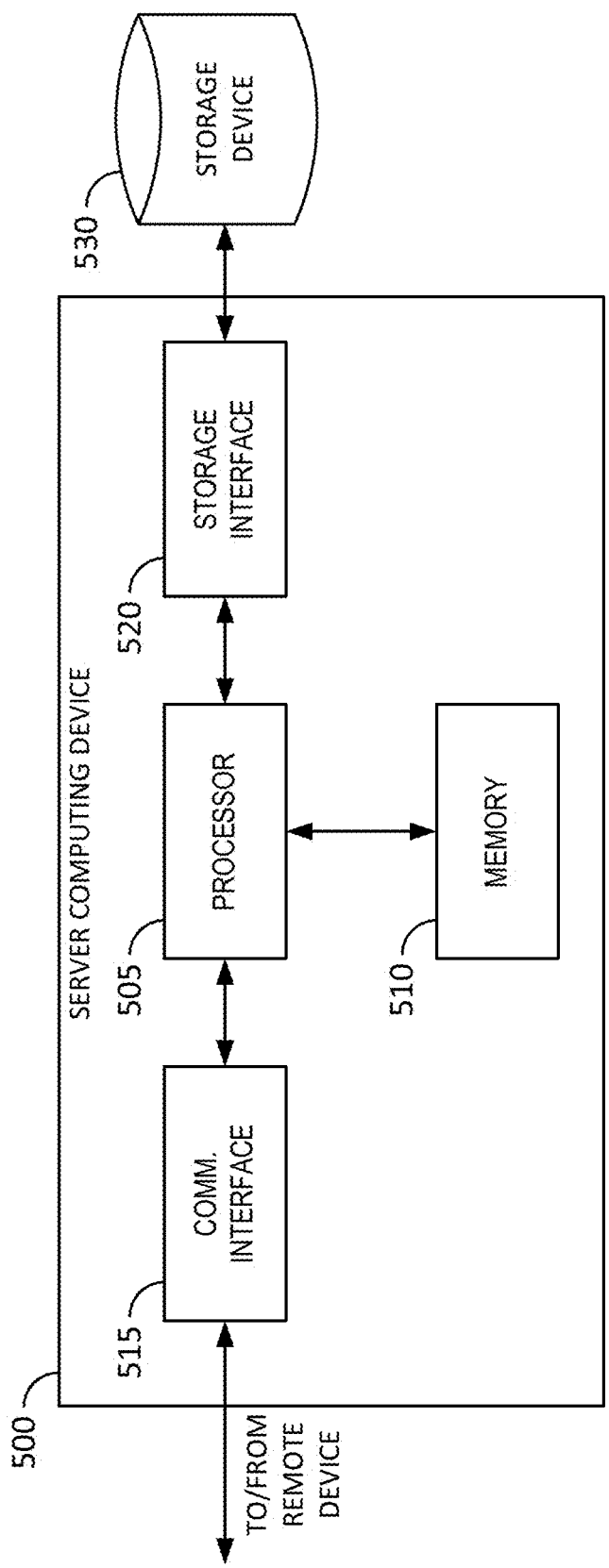
FIG. 5 illustrates an example configuration of a server computing device, in accordance with embodiments of the present disclosure.

FIG. 5 illustrates an example configuration of a server computing device 500, in accordance with some embodiments of the present disclosure. Server computing device 500 may be used to implement passive MFA server 130 or ACS 140 shown in FIG. 1. In the exemplary embodiment, server computing device 500 includes one or more processors 505 for executing instructions (not shown) stored in a memory 510. In an embodiment, processor 505 may include one or more processing units (e.g., in a multi-core configuration). The instructions may be executed within various different operating systems, such as UNIX®, LINUX® (LINUX is a registered trademark of Linus Torvalds), Microsoft Windows®, etc. It should also be appreciated that upon initiation of a computer-based method, various instructions may be executed during initialization. Some operations may be required in order to perform one or more processes described herein, while other operations may be more general or specific to a particular programming language (e.g., C, C#, C++, Java, or other suitable programming languages, etc.).

In the example embodiment, processor 505 is operatively coupled to a communication interface 515 such that server computing device 500 is capable of communicating with a remote device such as a user system or another device 400. For example, communication interface 515 may receive requests from user computing device 400 via the Internet, within the scope of the embodiment illustrated in FIG. 5.

In the example embodiment, processor 505 is also operatively coupled to a storage device 530, which may be, for example, a computer-operated hardware unit suitable for storing or retrieving data. In some embodiments, storage device 530 is integrated in device 500. For example, device 500 may include one or more hard disk drives as storage device 530. In other embodiments, storage device 530 is external to device 500 and may be accessed by a plurality of systems 500. For example, storage device 530 may include multiple storage units such as hard disks or solid state disks in a redundant array of inexpensive disks (RAID) configuration. Storage device 530 may include a storage area network (SAN) or a network attached storage (NAS) system. Storage device 530 may be used as a repository for one or more databases or other data structures for storing various data elements received, processed, and/or generated by passive MFA server 130 or ACS 140, as discussed with respect to FIGS. 1-3 and 6.

In some embodiments, processor 505 is operatively coupled to storage device 530 via an optional storage interface 520. Storage interface 520 may include, for example, a component capable of providing processor 505 with access to storage device 530. In an exemplary embodiment, storage interface 520 further includes one or more of an Advanced Technology Attachment (ATA) adapter, a Serial ATA (SATA) adapter, a Small Computer System Interface (SCSI) adapter, a RAID controller, a SAN adapter, a network adapter, or a similarly capable component providing processor 505 with access to storage device 530.

Memory area 510 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

Figure 6:
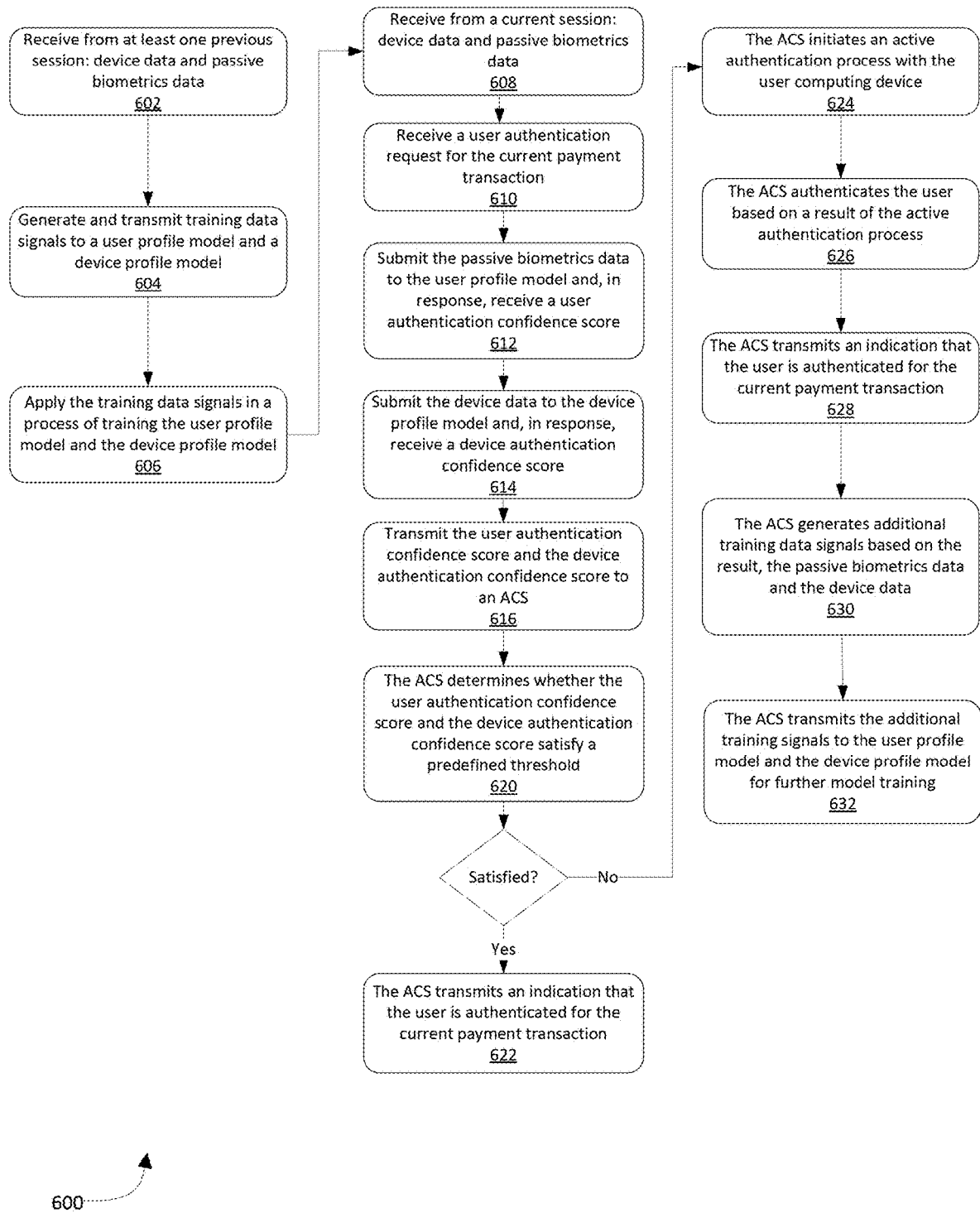
FIG. 6 is a flow diagram of an example method for authenticating payment transactions using the passive MFA server and passive MFA client of FIG. 1.

FIG. 6 is a flow diagram of an example method 600 for authenticating payment transactions using passive MFA server 130 and passive MFA client 111. In the example embodiment, method 600 includes receiving 608, by passive MFA server 130, such as via communications interface 515 from user computing device 110, passive biometrics data 241 and device data 240 collected during a current session of user computing device 110 on remote site 120, and receiving 610 by passive MFA server 130, such as via communications interface 515, user authentication request 307 for a current payment transaction associated with the current session on remote site 120. Method 600 also includes submitting 612 passive biometrics data 241 to user profile model 350, and in response receiving 612 user authentication confidence score 322; submitting 614 device data 240 to device profile model 360, and in response receiving 614 device authentication confidence score 323; and transmitting 616, such as via communication interface 515, user authentication confidence score 322 and device authentication confidence score 323 to ACS 140. Method 600 further includes ACS 140 determining 620 whether user authentication confidence score 322 and device authentication confidence score 323 satisfy a predefined threshold for passively authenticating a user of user computing device 110 during the current session, and transmitting 622, to remote site 120 in response to a determination that the predefined threshold is satisfied and without conducting an active authentication process with user 160, an indication that user 160 is authenticated for the current payment transaction.

In some embodiments, method 600 further includes receiving 602 by passive MFA server 130, such as via communications interface 515 from user computing device 110 prior to the current session of user computing device 110 on remote site 120, a first plurality of passive biometrics data 241 and a first plurality of device data 240 collected during at least one previous session of user computing device 110 on remote site 120; in response to receiving the first plurality of passive biometrics data 241 and the first plurality of device data 240, generating and transmitting 604, by passive MFA server 130, training data signals 304 and/or 305 to user profile model 350 and device profile model 360; and applying 606 by passive MFA server 130, prior to the current session of user computing device 110 on remote site 120, training data signals 304 and/or 305 in a process of training user profile model 350 and device profile model 360.

In some embodiments, step 608 further includes receiving by passive MFA server 130, such as via communications interface 515 from user computing device 110, user behavioral data 242 collected during the current session of user computing device 110 on remote site 120; and step 612 further includes submitting, by passive MFA server 130, user behavioral data 242, in combination with passive biometrics data 241, to user profile model 350 for use in determining user authentication confidence score 322.

In some embodiments, method 600 further includes repeating steps 608 through 620 for a second session of user computing device 110 on remote site 120 and, in response to a determination at step 620 that the predefined threshold is not met, initiating 624, by ACS 140, an active authentication process with user computing device 110; authenticating 626, by ACS 140, user 160 based on a result of the active authentication process; and transmitting 628 by ACS 140, to remote site 120 in response to the authentication via the active authentication process with user 160, an indication that user 160 is authenticated for the second payment transaction. In some embodiments, in response to the transmission of the result, method 600 further includes generating 630, by passive MFA server 130, additional training data signals 317 and 318 based on the result, the second passive biometrics data 241, and the second device data 240; and transmitting 632, by passive MFA server 130, additional training signals 317 and 318 to user profile model 350 and device profile model 360 for further training of user profile model 350 and device profile model 360.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of passive multi-factor authentication. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A passive Multi-Factor Authentication (MFA) system comprising an Access Control Server (ACS) and a passive MFA server, the passive MFA server comprising at least one first processor in communication with a first memory device and a communications interface, the first memory device including a first set of computer-readable instructions therein that, when executed by the at least one first processor, cause the at least one first processor to:
   receive, via the communications interface from a user computing device, passive biometrics data and device data collected during a current session of the user computing device on a remote site while a user of the user computing device browses the remote site, wherein browsing the remote site occurs before (a) the remote site requests user credentials and (b) the user initiates a first payment transaction associated with the current session by inputting account information into the remote site, and wherein the account information is associated with a payment account of the user;
   in response to initiating the first payment transaction, receive, via the communications interface, a user authentication request for the first payment transaction;
   submit the passive biometrics data to a user profile model, and in response receive a user authentication confidence score;
   submit the device data to a device profile model, and in response receive a device authentication confidence score; and
   transmit, via the communication interface, the user authentication confidence score and the device authentication confidence score to the ACS;
   wherein the ACS comprises at least one second processor in communication with a second memory device, the second memory device including a second set of computer-readable instructions therein that, when executed by the at least one second processor, cause the at least one second processor to:
      determine that each of the user authentication confidence score and the device authentication confidence score satisfies a predefined threshold for passively authenticating the user of the user computing device during the current session; and
      transmit, to the remote site in response to the determination and without conducting an active authentication process with the user, an indication that the user is authenticated for the first payment transaction.

2. The MFA system of claim 1, wherein the first set of computer-readable instructions further cause the at least one first processor to:

receive, via the communications interface from the user computing device prior to the current session of the user computing device on the remote site, a first plurality of passive biometrics data and a first plurality of device data collected during at least one previous session of the user computing device on the remote site;

in response to receiving the first plurality of passive biometrics data and the first plurality of device data, generate and transmit training data signals to the user profile model and the device profile model; and apply, prior to the current session of the user computing device on the remote site, the training data signals in a process of training the user profile model and the device profile model.

3. The MFA system of claim 1, wherein the passive biometrics data includes one of:

wherein the user computing device interacts with the remote site via a web browser executing on the user computing device, at least one of keystroke patterns and mouse click patterns; and wherein the user computing device interacts with the remote site via a merchant application executing on the user computing device, at least one of tap patterns, scroll patterns, fling patterns, pinch patterns, and device orientation.

4. The MFA system of claim 1, wherein the device data includes one of:

wherein the user computing device interacts with the remote site via a web browser executing on the user computing device, at least one of device ID, device type, device platform, device browser, browser IP address, browser time zone, browser user-agent, browser screen width, browser height, and browser language; and wherein the user computing device interacts with the remote site via a merchant application executing on the user computing device, the at least one of device ID, the device platform, device OS version, device time zone, device name, device screen resolution, device IP address, device latitude, and device longitude.

5. The MFA system of claim 1, further comprising a directory server configured to route communications among the remote site, the passive MFA server, and the ACS.

6. The MFA system of claim 1, wherein the first set of computer-readable instructions further cause the at least one first processor to:

receive, via the communications interface from the user computing device subsequent to the current session, second passive biometrics data and second device data collected during a second session of the user computing device on the remote site;

receive, via the communications interface from the remote site, a second user authentication request for a second payment transaction, submit the second passive biometrics data to the user profile model, and in response receive a second user authentication confidence score;

submit the second device data to the device profile model, and in response receive a second device authentication confidence score; and transmit, via the communication interface, the second user authentication confidence score and the second device authentication confidence score to the ACS;

wherein the second set of computer-readable instructions further cause the at least one second processor to:

determine that the second user authentication confidence score and the second device authentication confidence score do not satisfy the predefined threshold for passively authenticating the user of the user computing device;

in response to the determination that the predefined threshold is not met, initiate the active authentication process with the user computing device;

authenticate the user based on a result of the active authentication process; and transmit, to the remote site in response to the authentication via the active authentication process with the user, an indication that the user is authenticated for the second payment transaction.

7. The MFA system of claim 6, wherein the second set of computer-readable instructions further cause the at least one second processor to transmit the result of the active authentication process to the passive MFA server, and wherein the first set of computer-readable instructions further cause the at least one first processor to:

in response to the transmission of the result, generate additional training data signals based on the result, the second passive biometrics data, and the second device data; and transmit the additional training data signals to the user profile model and the device profile model for further training of the user profile model and the device profile model.

8. The MFA system of claim 1, wherein the first set of computer-readable instructions further cause the at least one first processor to:

receive, via the communications interface from the user computing device, user behavioral data collected during the current session of the user computing device on the remote site; and submit the user behavioral data, in combination with the passive biometrics data, to the user profile model for use in determining the user authentication confidence score.

9. A computer-implemented method for Multi-Factor Authentication (MFA), the method implemented using an Access Control Server (ACS) and a passive MFA server, wherein the passive MFA server comprises at least one first processor in communication with a first memory device and a communications interface, wherein the ACS comprises at least one second processor in communication with a second memory device, and wherein the method comprises:

receiving, by the passive MFA server via the communications interface from a user computing device, passive biometrics data and device data collected during a current session of the user computing device on a remote site while a user of the user computing device browses the remote site, wherein browsing the remote site occurs before (a) the remote site requests user credentials and (b) the user initiates a first payment transaction associated with the current session by inputting account information into the remote site, and wherein the account information is associated with a payment account of the user;

in response to initiating the first payment transaction, receiving, by the passive MFA server via the communications interface, a user authentication request for the first payment transaction;

submitting, by the passive MFA server, the passive biometrics data to a user profile model, and in response receiving a user authentication confidence score;

submitting, by the passive MFA server, the device data to a device profile model, and in response receiving a device authentication confidence score;

transmitting, by the passive MFA server via the communication interface, the user authentication confidence score and the device authentication confidence score to the ACS;

determining, by the ACS, that each of the user authentication confidence score and the device authentication confidence score satisfies a predefined threshold for passively authenticating the user of the user computing device during the current session; and transmitting, by the ACS to the remote site in response to the determination and without conducting an active authentication process with the user, an indication that the user is authenticated for the first payment transaction.

10. The method of claim 9, further comprising:

receiving, by the passive MFA server via the communications interface from the user computing device prior to the current session of the user computing device on the remote site, a first plurality of passive biometrics data and a first plurality of device data collected during at least one previous session of the user computing device on the remote site;

in response to receiving the first plurality of passive biometrics data and the first plurality of device data, generating and transmitting, by the passive MFA server, training data signals to the user profile model and the device profile model; and applying by the passive MFA server, prior to the current session of the user computing device on the remote site, the training data signals in a process of training the user profile model and the device profile model.

11. The method of claim 9, wherein the passive biometrics data includes one of:

wherein the user computing device interacts with the remote site via a web browser executing on the user computing device, at least one of keystroke patterns and mouse click patterns; and wherein the user computing device interacts with the remote site via a merchant application executing on the user computing device, at least one of tap patterns, scroll patterns, fling patterns, pinch patterns, and device orientation.

12. The method of claim 9, wherein the device data includes one of:

wherein the user computing device interacts with the remote site via a web browser executing on the user computing device, at least one of device ID, device type, device platform, device browser, browser IP address, browser time zone, browser user-agent, browser screen width, browser height, and browser language; and wherein the user computing device interacts with the remote site via a merchant application executing on the user computing device, the at least one of device ID, the device platform, device OS version, device time zone, device name, device screen resolution, device IP address, device latitude, and device longitude.

13. The method of claim 9, further comprising: routing, by a directory server, communications among the remote site, the passive MFA server, and the ACS.

14. The method of claim 9, further comprising:

receiving by the passive MFA server, via the communications interface from the user computing device subsequent to the current session, second passive biometrics data and second device data collected during a second session of the user computing device on the remote site;

receiving by the passive MFA server, via the communications interface from the remote site, a second user authentication request for a second payment transaction, submitting, by the passive MFA server, the second passive biometrics data to the user profile model, and in response receiving a second user authentication confidence score;

submitting, by the passive MFA server, the second device data to the device profile model, and in response receiving a second device authentication confidence score;

transmitting by the passive MFA server, via the communication interface, the second user authentication confidence score and the second device authentication confidence score to the ACS;

determining, by the ACS, that the second user authentication confidence score and the second device authentication confidence score do not satisfy the predefined threshold for passively authenticating the user of the user computing device;

in response to the determination that the predefined threshold is not met, initiating, by the ACS, the active authentication process with the user computing device;

authenticating, by the ACS, the user based on a result of the active authentication process; and transmitting by the ACS, to the remote site in response to the authentication via the active authentication process with the user, an indication that the user is authenticated for the second payment transaction.

15. The method of claim 14, further comprising:

in response to the transmission of the result, generating, by the passive MFA server, additional training data signals based on the result, the second passive biometrics data, and the second device data; and transmitting, by the passive MFA server, the additional training data signals to the user profile model and the device profile model for further training of the user profile model and the device profile model.

16. The method of claim 9, further comprising:

receiving, by the passive MFA server via the communications interface from the user computing device, user behavioral data collected during the current session of the user computing device on the remote site; and submitting, by the passive MFA server, the user behavioral data, in combination with the passive biometrics data, to the user profile model for use in determining the user authentication confidence score.

17. At least one non-transitory computer readable medium that includes a first set of computer executable instructions and a second set of computer executable instructions for passive Multi-Factor Authentication (MFA), wherein when executed by a passive MFA server, the passive MFA server comprising at least one first processor in communication with a communications interface, the first set of computer executable instructions cause the at least one first processor to:

receive, via the communications interface from a user computing device, passive biometrics data and device data collected during a current session of the user computing device on a remote site while a user of the user computing device browses the remote site, wherein browsing the remote site occurs before (a) the remote site requests user credentials and (b) the user initiates a first payment transaction associated with the current session by inputting account information into the remote site, and wherein the account information is associated with a payment account of the user;

in response to initiating the first payment transaction, receive, via the communications interface, a user authentication request for the first payment transaction;

submit the passive biometrics data to a user profile model, and in response receive a user authentication confidence score;

submit the device data to a device profile model, and in response receive a device authentication confidence score; and transmit, via the communication interface, the user authentication confidence score and the device authentication confidence score to an Access Control Server (ACS), the ACS comprising at least one second processor; and wherein when executed by the ACS, the second set of computer executable instructions cause the at least one second processor to:

determine that each of the user authentication confidence score and the device authentication confidence score satisfies a predefined threshold for passively authenticating the user of the user computing device during the current session; and transmit, to the remote site in response to the determination and without conducting an active authentication process with the user, an indication that the user is authenticated for the first payment transaction.

18. The at least one non-transitory computer readable medium of claim 17, wherein the first set of computer executable instructions further cause the at least one first processor to:

receive, via the communications interface from the user computing device prior to the current session of the user computing device on the remote site, a first plurality of passive biometrics data and a first plurality of device data collected during at least one previous session of the user computing device on the remote site;

in response to receiving the first plurality of passive biometrics data and the first plurality of device data, generate and transmit training data signals to the user profile model and the device profile model; and apply, prior to the current session of the user computing device on the remote site, the training data signals in a process of training the user profile model and the device profile model.

19. The at least one non-transitory computer readable medium of claim 17, wherein the first set of computer executable instructions further cause the at least one first processor to:

receive, via the communications interface from the user computing device subsequent to the current session, second passive biometrics data and second device data collected during a second session of the user computing device on the remote site;

receive, via the communications interface from the remote site, a second user authentication request for a second payment transaction, submit the second passive biometrics data to the user profile model, and in response receive a second user authentication confidence score;

submit the second device data to the device profile model, and in response receive a second device authentication confidence score; and transmit, via the communication interface, the second user authentication confidence score and the second device authentication confidence score to the ACS;

wherein the second set of computer executable instructions further cause the at least one second processor to:

determine that the second user authentication confidence score and the second device authentication confidence score do not satisfy the predefined threshold for passively authenticating the user of the user computing device;

in response to the determination that the predefined threshold is not met, initiate the active authentication process with the user computing device;

authenticate the user based on a result of the active authentication process; and transmit, to the remote site in response to the authentication via the active authentication process with the user, an indication that the user is authenticated for the second payment transaction.

20. The at least one non-transitory computer readable medium of claim 19, wherein the second set of computer executable instructions further cause the at least one second processor to transmit the result of the active authentication process to the passive MFA server, and wherein the first set of computer executable instructions further cause the at least one first processor to:

in response to the transmission of the result, generate additional training data signals based on the result, the second passive biometrics data, and the second device data; and transmit the additional training data signals to the user profile model and the device profile model for further training of the user profile model and the device profile model.

21. The at least one non-transitory computer readable medium of claim 17, wherein the first set of computer executable instructions further cause the at least one first processor to:

receive, via the communications interface from the user computing device, user behavioral data collected during the current session of the user computing device on the remote site; and submit the user behavioral data, in combination with the passive biometrics data, to the user profile model for use in determining the user authentication confidence score.

* * * * *